(12) United States Patent
Johnson et al.

(10) Patent No.: US 12,089,528 B2
(45) Date of Patent: Sep. 17, 2024

(54) PRODUCT FLOW SPLITTER FOR AN AGRICULTURAL IMPLEMENT

(71) Applicant: CNH Industrial America LLC, New Holland, PA (US)

(72) Inventors: Chad Michael Johnson, Arlington Heights, IL (US); Grant Thomas MacDonald, Hampshire, IL (US)

(*) Notice: Subject to any disclaimer, the term of this patent is extended or adjusted under 35 U.S.C. 154(b) by 273 days.

(21) Appl. No.: 17/714,685

(22) Filed: Apr. 6, 2022

(65) Prior Publication Data
US 2023/0320257 A1 Oct. 12, 2023

(51) Int. Cl.
*A01C 7/20* (2006.01)
(52) U.S. Cl.
CPC ...................................... *A01C 7/20* (2013.01)
(58) Field of Classification Search
None
See application file for complete search history.

(56) References Cited

U.S. PATENT DOCUMENTS

| | | | | |
|---|---|---|---|---|
| 2,110,430 A | * | 3/1938 | Swatson | F25B 41/45 137/262 |
| 2,126,364 A | * | 8/1938 | Witzel | F25B 39/028 137/262 |
| 2,193,696 A | * | 3/1940 | Ramsaur | F25B 39/028 137/262 |
| 3,776,269 A | * | 12/1973 | Watts | E03F 5/0402 137/262 |
| 6,289,830 B2 | | 9/2001 | Mayerle et al. | |
| 6,668,738 B2 | | 12/2003 | Lee et al. | |
| 7,025,010 B2 | | 4/2006 | Martin et al. | |
| 7,213,617 B2 | | 5/2007 | Snipes et al. | |
| 7,418,908 B2 | | 9/2008 | Landphair et al. | |
| 7,752,984 B2 | | 7/2010 | Memory | |

(Continued)

FOREIGN PATENT DOCUMENTS

| | | |
|---|---|---|
| CN | 103204088 A | 7/2013 |
| CN | 208935626 U | 6/2019 |

OTHER PUBLICATIONS

Sherwin et al., The influence of out-of-plane geometry on the flow within a distal end-to-side anastomosis, Mar. 2000, pp. 1-13, https://www.researchgate.net/figure/Model-geometries-of-distal-end-of-the-45-deg-end-toside-anastomosis-a-planar-b_fig2_12526203.

*Primary Examiner* — Joseph A Dillon, Jr.
(74) *Attorney, Agent, or Firm* — Rebecca Henkel; Rickard K. DeMille; Peter K. Zacharias (57) ABSTRACT

A product flow splitter is used to distribute agricultural product from a distribution line to a primary hopper and a secondary hopper. The splitter has an inlet segment, a primary outlet segment, and a secondary outlet segment. The inlet segment receives the agricultural product from the distribution line, the primary outlet segment outputs the agricultural product to the primary hopper, and the secondary outlet segment outputs the agricultural product to the secondary hopper. The primary outlet segment is aligned with the inlet segment along a common axis and the secondary outlet segment is curved to avoid plugging of the agricultural product in the product flow splitter. The primary outlet segment is positioned relative to the primary hopper so that an outlet of the primary outlet segment in the primary hopper is offset from an outlet of the primary hopper to a meter system to solve an overfilled situation.

20 Claims, 5 Drawing Sheets

(56) References Cited

U.S. PATENT DOCUMENTS

| | | |
|---|---|---|
| 7,966,954 B2 | 6/2011 | Anderson et al. |
| 8,079,317 B2 | 12/2011 | Anderson et al. |
| 8,276,530 B2 | 10/2012 | Anderson et al. |
| 8,348,556 B2 * | 1/2013 | Hilgraf ............... F27B 1/10 |
| | | 406/146 |
| 8,770,120 B2 * | 7/2014 | Naylor ............... A01C 7/082 |
| | | 111/175 |
| 9,446,327 B2 * | 9/2016 | Lee ..................... B01J 4/005 |
| 10,260,373 B2 | 4/2019 | Lewis et al. |
| 10,575,456 B2 * | 3/2020 | Schoeny ............ A01C 7/082 |
| 10,779,461 B2 | 9/2020 | Garner et al. |
| 10,820,482 B2 * | 11/2020 | Hui .................... A01C 7/082 |
| 11,839,174 B2 * | 12/2023 | Johnson ............ A01C 7/082 |
| 2005/0035592 A1 | 2/2005 | Williams |
| 2014/0246850 A1 * | 9/2014 | Naylor ............... A01C 7/206 |
| | | 285/133.11 |

\* cited by examiner

PRODUCT FLOW SPLITTER FOR AN AGRICULTURAL IMPLEMENT

BACKGROUND

The present disclosure relates generally to a product flow splitter for an agricultural implement.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit agricultural product (e.g., seed, fertilizer, etc.) at a desired depth beneath the soil surface of a field, thereby establishing rows of planted agricultural product. For example, each row unit typically includes a ground engaging tool or opener that forms a path (e.g., trench) for agricultural product deposition into the soil. An agricultural product conveying system (e.g., seed tube or powered agricultural product conveyor) is configured to deposit the agricultural product into the trench. The opener/agricultural product conveying system may be followed by closing discs that move displaced soil back into the trench and/or a packer wheel that packs the soil on top of the deposited agricultural product. Furthermore, each row unit may include an agricultural product meter configured to control a flow of the agricultural product from an agricultural product hopper assembly into the agricultural product conveying system, thereby controlling agricultural product spacing within the soil.

In certain planting implements, distribution lines may distribute the agricultural product from a central product storage compartment to the row units. For example, the planting implement may include an inductor assembly configured to receive the agricultural product from the central product storage compartment, fluidize the agricultural product into an air/product mixture, and distribute the air/product mixture to multiple distribution lines. The distribution lines may extend from the inductor assembly to the row units (e.g., directly, via a header, via a splitter, etc.). For example, a single distribution line may provide the air/product mixture to more than one seed hopper assembly, e.g., a primary hopper assembly and a secondary hopper assembly, by using a splitter. The primary hopper assembly and the secondary hopper assembly are configured to deliver the agricultural product into respective agricultural product metering systems, which are configured to control respective flows of the agricultural product into the respective agricultural product conveying systems.

Seed splitters can sometimes have issues with plugging during use. In addition, seed splitters can sometimes cause overfilled issues during use, in which the seed continues to be delivered into the hopper even when the hopper is completely full of seed.

SUMMARY

In certain embodiments, a product flow splitter for an agricultural implement includes an inlet segment, a primary outlet segment, and a secondary outlet segment. The inlet segment is configured to receive agricultural product from a distribution line. The primary outlet segment is connected to the inlet segment and aligned with the inlet segment along a common axis. The primary outlet segment is configured to output the agricultural product, via a primary outlet, to a storage area within a primary hopper of the agricultural implement. The primary outlet is configured to be offset from the outlet of the primary hopper (e.g., on an opposite side of a central vertical axis of an outlet of the primary hopper from an inlet of the primary hopper along a longitudinal axis, and the central vertical axis extends through a longitudinal center of the outlet of the primary hopper). The secondary outlet segment is connected to the inlet segment and configured to output the agricultural product to a secondary hopper of the agricultural implement, and the secondary outlet segment is curved.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure is directed to a product flow splitter for use with a bulk fill delivery system of an agricultural implement, which distributes agricultural product from a central product storage compartment, which is typically centrally located on the agricultural implement, to multiple seed hoppers, in which a seed hopper is associated with each row unit. The splitter divides an air/product mixture, e.g., air/seed mixture, from a pneumatic distribution line, between two receptacles, e.g., a primary hopper of one row unit and a secondary hopper of another row unit. The splitter has an inlet segment, a primary outlet segment, and a secondary outlet segment. The inlet segment receives the air/product mixture from the distribution line. The splitter is oriented such that the primary outlet segment exhausts a threshold amount of the air/product mixture into the primary hopper. When the primary hopper is filled with the threshold amount, agricultural product may begin to build up within the primary outlet segment. As used herein, "threshold amount" refers to a level of agricultural product in the primary hopper relative to the primary outlet segment, and "full" refers to a maximum target amount of the agricultural product in the primary hopper. When the agricultural product reaches the intersection of the primary outlet segment, the secondary outlet segment, and the inlet segment, the air/product mixture may then be exhausted through the secondary outlet segment. The secondary outlet segment is fluidly coupled to the secondary hopper via a jumper hose. Accordingly, the product flow splitter may pass a significant amount of agricultural product to the secondary hopper when the primary hopper is filled with the threshold amount.

In the present disclosure, the primary outlet segment is connected to the inlet segment and aligned with the inlet segment along a common axis. A straight flow passage for the agricultural product to flow from the distribution line to the primary hopper is formed by the inlet segment and the primary outlet segment to avoid the seed plugging. The primary outlet segment is configured to output the agricultural product, via a primary outlet, to a storage area within the primary hopper. The primary outlet is configured to be offset from the outlet of the primary hopper (e.g., on an opposite side of a central vertical axis of an outlet of the primary hopper from an inlet of the primary hopper along a longitudinal axis, and the central vertical axis extends through a longitudinal center of the outlet of the primary hopper). As the corresponding row unit moves (e.g., due to operation on rough ground), gravity and the row units downforce system drive the agricultural product to move within the primary hopper. The agricultural product may move from a base portion of the primary hopper to a side portion of the primary hopper under the influence of gravity. Because the primary outlet of the primary outlet segment is positioned to be offset from the outlet of the primary hopper (e.g., on an opposite side of the central vertical axis from the inlet along the longitudinal axis), the agricultural product in the side portion may be output through the outlet before the agricultural product flowing out of the outlet of the primary outlet segment flows to the outlet. Accordingly, the possibility of the primary hopper becoming overfilled may be substantially reduced or eliminated (e.g., as compared to the current product).

In the present disclosure, the secondary outlet segment is curved to avoid being plugged at the intersection of the inlet segment and the secondary outlet segment when too many seeds rush toward the secondary outlet segment at once.

Figure 1:
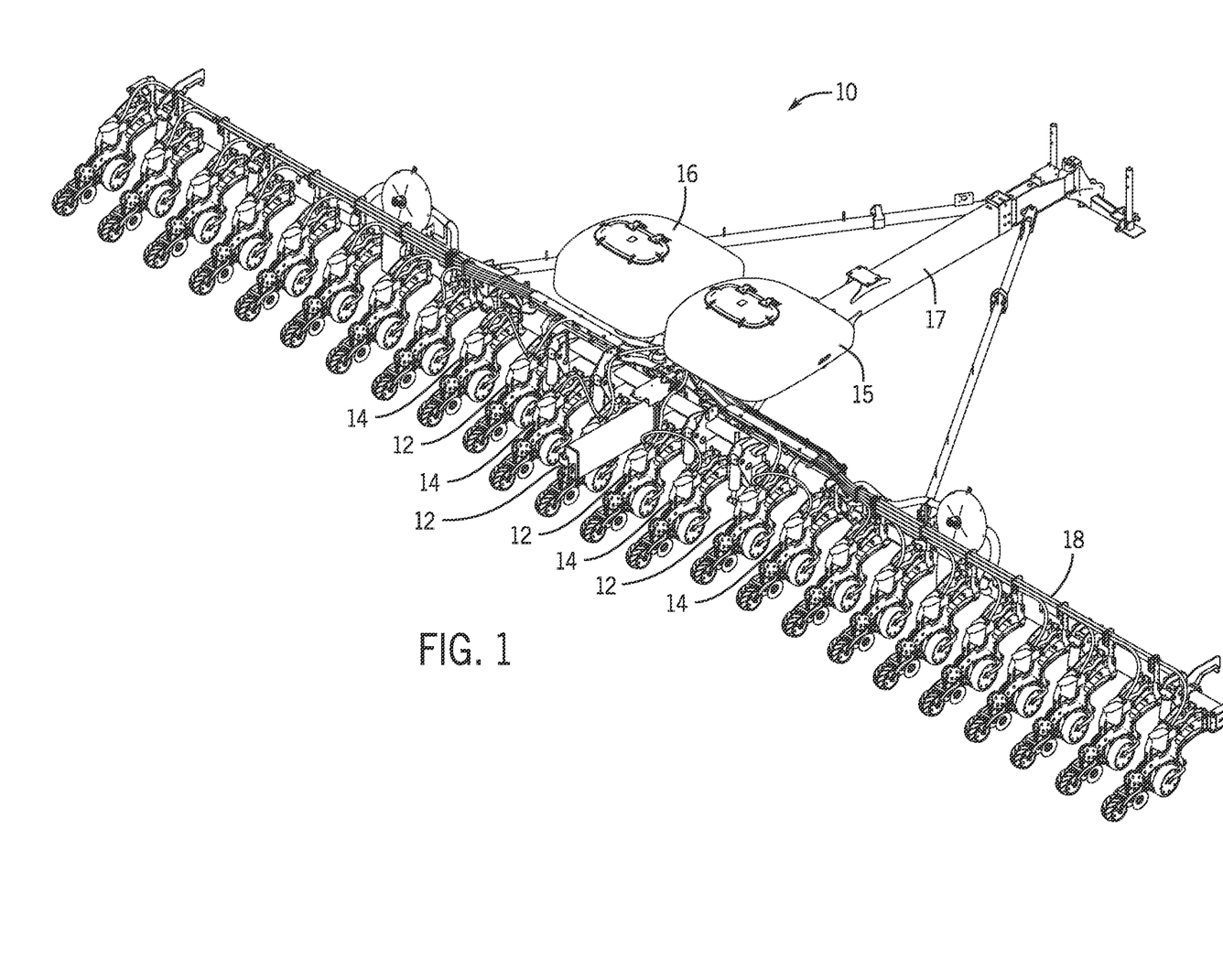
FIG. 1 is a perspective view of an embodiment of an agricultural implement having multiple row units distributed across a width of the agricultural implement.

FIG. 1 is a perspective view of an embodiment of an agricultural implement 10 (e.g., planting implement) having multiple row units distributed across a width of the agricultural implement 10. Some of the row units may be primary row units 12 having primary hopper assemblies, which are connected to respective primary outlet segments of respective product flow splitters as described in greater detail below. Some row units may be secondary row units 14 having respective secondary hopper assemblies, which are connected to respective secondary outlet segments of the respective product flow splitters as described in greater detail below. In some embodiments, at least one pair of row units of the multiple row units distributed across the width of the agricultural implement 10 includes a primary row unit 12 and a secondary row unit 14 connected by a product flow splitter. In some embodiment, each pair of row units of the multiple row units distributed across the width of the agricultural implement 10 includes a respective primary row unit 12 and a respective secondary row unit 14 connected by a respective product flow splitter. The product flow splitters receive agricultural product from a central product storage compartment 15 or 16, which is typically centrally located on the agricultural implement 10. In certain embodiments, the agricultural implement 10 may include an inductor assembly configured to receive the agricultural product from the central product storage compartment 15 or 16, fluidize the agricultural product into an air/agricultural product mixture, and distribute the air/agricultural product mixture to multiple distribution lines. The distribution lines may extend from the inductor assembly to the primary row units 12 and secondary row units 14 via the product flow splitters.

The agricultural implement 10 is configured to be towed through a field behind a work vehicle, such as a tractor. As illustrated, the agricultural implement 10 includes a tongue assembly 17, which includes a hitch configured to couple the agricultural implement 10 to an appropriate tractor hitch (e.g., via a ball, clevis, or other coupling). The tongue assembly 17 is coupled to a tool bar 18 which may support multiple primary row units 12 and multiple secondary row units 14. Each primary row unit 12 and secondary row unit 14 may include one or more opener discs configured to form a path (e.g., trench) within soil of a field. Each row unit may also include an agricultural product conveying system (e.g., seed tube or powered agricultural product conveyer) configured to deposit agricultural product (e.g., seed, fertilizer, etc.) into the path/trench. In addition, each primary row unit 12 and each secondary row unit 14 may include closing disc(s) and/or a packer wheel positioned behind the agricultural product conveying system. The closing disc(s) are configured to move displaced soil back into the path/trench, and the packer wheel is configured to pack soil on top of the deposited agricultural product. Furthermore, each primary row unit 12 and each secondary row unit 14 may include a respective agricultural product meter configured to control a flow of the agricultural product from a respective hopper assembly into the agricultural product conveying system, thereby controlling agricultural product spacing within the soil.

Figure 2:
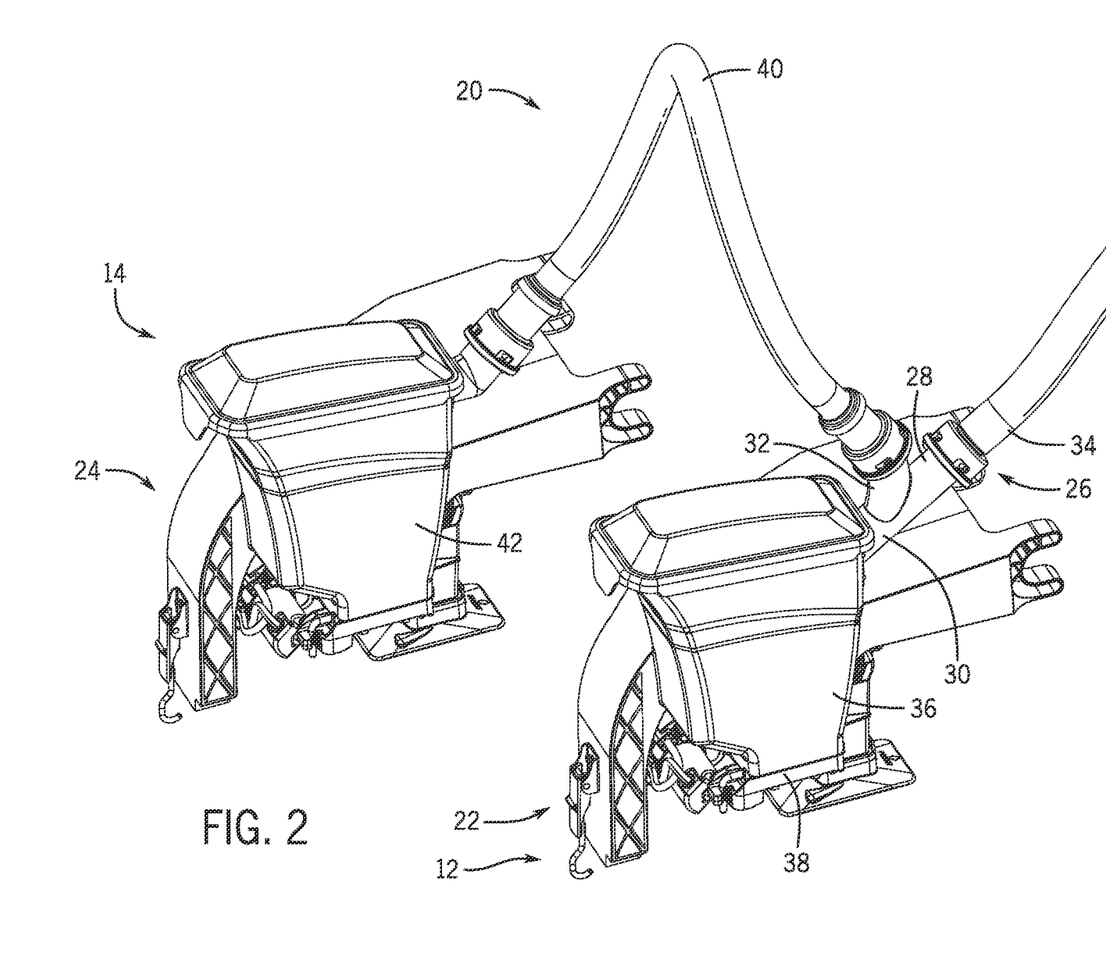
FIG. 2 is a perspective view of an embodiment of an agricultural product hopper assembly group that may be employed within the agricultural implement of FIG. 1.

FIG. 2 is a perspective view of an embodiment of an agricultural product hopper assembly group 20 that may be employed within the agricultural implement of FIG. 1. The agricultural product hopper assembly group 20 includes a primary hopper assembly 22 of the primary row unit 12, and a secondary hopper assembly 24 of the secondary row unit 14. The primary hopper assembly 22 is connected, via a product flow splitter 26, to the secondary hopper assembly 24. The product flow splitter 26 includes an inlet segment 28, a primary outlet segment 30, and a secondary outlet segment 32. The inlet segment 28 is connected to a distribution line 34 to receive the air/agricultural product mixture. The air/agricultural product mixture flows through the distribution line 34 into the inlet segment 28, and then the air/agricultural product mixture flows from the inlet segment 28 to the primary outlet segment 30 and enters a primary hopper 36 of the primary hopper assembly 22. The primary hopper 36 is configured to output the agricultural product into a respective agricultural product meter through an outlet 38, and the respective agricultural product meter is configured to control a flow of the agricultural product into an agricultural product conveying system of the primary row unit 12. When the primary hopper 36 is filled with the threshold amount, the agricultural product may begin to build up within the primary outlet segment 30. When the agricultural product reaches the intersection of the primary outlet segment 30, the secondary outlet segment 32, and the inlet segment 28, the air/agricultural product mixture may then be exhausted through the secondary outlet segment 32 to the secondary hopper assembly 24 via a jumper hose 40. The secondary hopper assembly 24 includes a secondary hopper 42 configured to output the agricultural product into a respective agricultural product meter, which is configured to control a flow of the agricultural product into an agricultural product conveying system of the secondary row unit 14.

Figure 3:
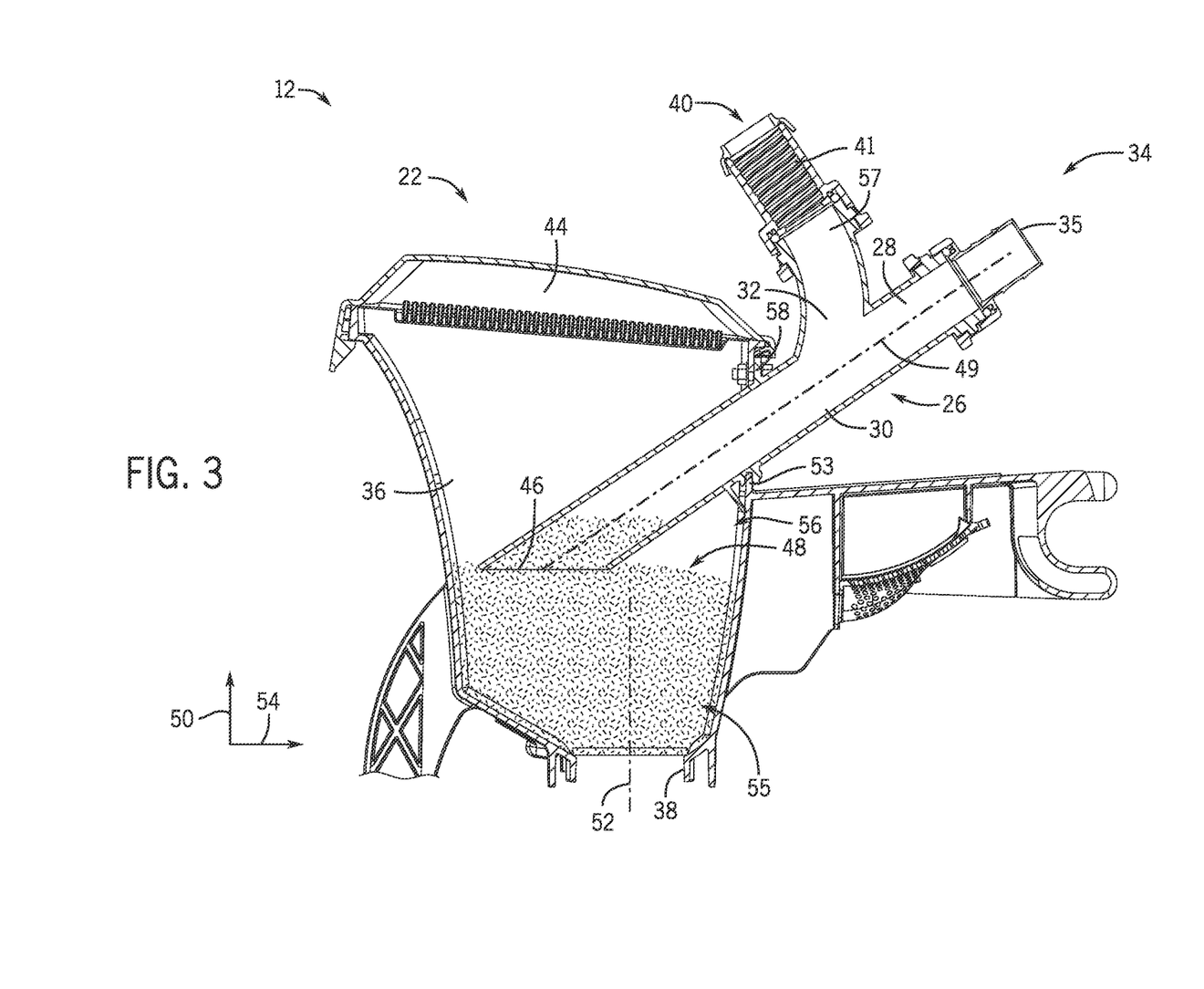
FIG. 3 is a cross-sectional view of an embodiment of a primary hopper assembly that may be employed within the agricultural product hopper assembly group of FIG. 2.

FIG. 3 is a cross-sectional view of the primary hopper assembly 22 that may be employed within the agricultural product hopper assembly group 20 of FIG. 2. In the illustrated embodiment, the primary hopper assembly 22 includes a primary hopper 36 and a lid 44 coupled to the primary hopper 36. The lid 44 is selectively removable from the primary hopper 36 to provide access to an interior of the primary hopper 36. As illustrated, the primary hopper 36 of the primary hopper assembly 22 is coupled to the primary outlet segment 30 of the product flow splitter 26. The primary outlet segment 30 is configured to output the air/agricultural product mixture into the primary hopper 36 through a primary outlet 46. As discussed in detail below, the primary hopper 36 has a storage area 48 for the agricultural product. As used herein, "storage area" refers to the portion of the hopper that collects/stores the agricultural product. The agricultural product flows from the distribution line 34 through a distribution line connector 35 into the inlet segment 28 to the primary outlet segment 30 and into the storage area 48 in the primary hopper 36. The agricultural product flows into the storage area 48 from the primary outlet 46 of the primary outlet segment 30, and the air exhausts from the hopper via a vent.

In the illustrated embodiment, the inlet segment 28 is substantially linear, and the primary outlet segment 30 is substantially linear. The inlet segment 28 and the primary outlet segment 30 are aligned with a common central axis 49. The air/agricultural product mixture flows from the distribution line 34 through the distribution line connector 35 into the inlet segment 28, continues through the primary outlet segment 30, and outputs from the primary outlet 46 to the primary hopper 36. In certain embodiments, the inlet segment 28 may taper outwardly from the distribution line connector 35 to the primary outlet segment 30, and the primary outlet segment 30 may taper outwardly from the inlet segment 28 to the primary outlet 46. This outwardly taper facilitates flow of the air/agricultural product mixture from the distribution line 34 to the primary outlet 46, thereby substantially reducing or eliminating the possibility of plugging in the inlet segment 28 and the primary outlet segment 30. In certain embodiments, at least one segment may be straight or taper inwardly.

In the illustrated embodiment, the agricultural product is output from the primary outlet 46 to the storage area 48 in the primary hopper 36. The primary hopper 36 is configured to output the agricultural product in the storage area 48 into a corresponding agricultural product meter through the outlet 38. The corresponding agricultural product meter is configured to output the agricultural product into a corresponding agricultural product conveying system of the primary row unit 12. During operation of the primary row unit 12, the agricultural product flows from the distribution line 34 through the distribution line connector 35 into the product flow splitter 26 to the storage area 48 of the primary hopper 36. Because the primary hopper 36 is vented, the airflow carrying the agricultural product is exhausted to the environment, thereby enabling the agricultural product to collect within the storage area 48. As the storage area 48 fills with agricultural product, the agricultural product may collect within at least a portion of the primary outlet segment 30, as illustrated. Because the product flow splitter 26 is not vented except from the secondary outlet segment 32, the agricultural product within the primary outlet segment 30 of the product flow splitter 26 may substantially reduce or block the airflow through the primary outlet segment 30, thereby restricting flow of the agricultural product to the primary hopper assembly 22. Accordingly, flow of the air/agricultural product to the primary hopper assembly 22 automatically terminates in response to the primary hopper assembly 22 receiving a maximum target amount of the agricultural product.

Furthermore, as the level of the agricultural product within the primary outlet segment 30 decreases during operation of the row unit (e.g., as the corresponding agricultural product meter conveys the agricultural product to the corresponding agricultural product conveying system of the primary row unit 12), the agricultural product no longer blocks primary outlet segment, thereby enabling agricultural product flow to the primary hopper assembly 22 to resume. Accordingly, flow of the air/agricultural product mixture to the primary hopper assembly 22 is automatically enabled in response to the agricultural product level in the primary hopper assembly 22 decreasing below a minimum target amount. The maximum target amount of the agricultural product collected in the primary hopper assembly 22 may be based on the orientation of the primary outlet segment 30 relative to the primary hopper 36 and the orientation of the primary outlet 46 relative to the outlet 38 of the primary hopper 36. In the illustrated embodiment, the primary outlet 46 is substantially parallel to the outlet 38 of the primary hopper 36. In other embodiments, the angle between the primary outlet 46 and the outlet 38 of the primary hopper 36 may be between about 0 degrees and 90 degrees. The maximum target amount of the agricultural product collected in the primary hopper assembly 22 may also be related to a position of the primary outlet 46 relative to the outlet 38 of the primary hopper 36 along a vertical axis 50.

In the illustrated embodiment, the primary outlet 46 is positioned on an opposite side of a central vertical axis 52 of the outlet 38 of the primary hopper 36 from an inlet 53 of the primary hopper 36, which receives the primary outlet segment 30, along a longitudinal axis 54. As illustrated, the central vertical axis 52 extends through a longitudinal center of the hopper outlet 38 of the primary hopper 36. As previously discussed, the agricultural product flows into the storage area 48 through the primary outlet 46 of the primary outlet segment 30. As the corresponding primary row unit 12 moves (e.g., due to operation on rough ground), gravity and the row unit downforce system drive the agricultural product to move within the primary hopper 36. The agricultural product may move from a base portion 55 of the primary hopper 36 to a side portion 56 of the primary hopper 36 under the influence of gravity and the row unit downforce system. Because the primary outlet 46 of the primary outlet segment 30 is positioned on an opposite side of the central vertical axis 52 from the inlet 53 along the longitudinal axis 54, the agricultural product in the side portion 56 may be output through the outlet 38 before the agricultural product flowing out of the primary outlet 46 of the primary outlet segment 30 flows to the outlet 38. Accordingly, the possibility of the primary hopper 36 becoming overfilled may be substantially reduced or eliminated (e.g., as compared to the system described above with the seed flowing into the hopper directly above the outlet of the hopper, in which the seed continues to be delivered into the hopper and output from the outlet of the hopper to the metering system, even when the hopper is completely full of seed). However, in other embodiments, the primary outlet 46 of the primary outlet segment 30 may be positioned in other orientations so that the primary outlet 46 is offset from the outlet 38.

In the illustrated embodiment, the secondary outlet segment 32 is arcuate and extends away from the inlet segment 28, as described in greater detail below in FIG. 4. The air/agricultural product mixture may flow through the secondary outlet segment 32, and the air/agricultural product mixture may then output from a secondary outlet 57 through a jumper hose connector 41 into the jumper hose 40, which is connected to the secondary hopper assembly, as described in greater detail below in FIG. 4. The air/agricultural product mixture flows through the jumper hose 40 into the secondary hopper assembly of the secondary row unit. In the illustrated embodiment, a flange 58 couples the primary outlet segment 30 to the primary hopper 36. The primary outlet segment 30 may be coupled by the flange 58 to the primary hopper 36 in different orientations so that the position of the primary outlet 46 is adjustable relative to the outlet 38 of the primary hopper 36, which is related to the maximum target amount of the agricultural product collected in the primary hopper assembly 22. In certain embodiments, different row units of an agricultural implement may have different maximum target amounts of the agricultural product for respective hoppers, and the respective primary outlet segments 30 may be coupled by the flange 58 to the respective primary hoppers 36 in corresponding orientations. In certain embodiments, different product flow splitters may be used, for example, based on prescribed product application rates for different planting areas or types of agricultural products, and the flange 58 provides a universal fit for coupling different product flow splitters to the corresponding hoppers. In certain embodiments, different product flow splitters may be used in the same agricultural implement, and the flange 58 may be configured to couple the different product flow splitters to corresponding hoppers in the same agricultural implement. In certain embodiments, only some of the row units in an agricultural implement may use product flow splitters, and the flange 58 may be used to couple the product flow splitters to corresponding hoppers. In certain embodiments, the flange 58 may be used to couple respective primary outlet segments of the product flow splitters to corresponding secondary hoppers (e.g., respective secondary outlet segments of the product flow splitters may be blocked or connected to additional hopers). However, in other embodiments, the flange may be omitted.

Figure 4:
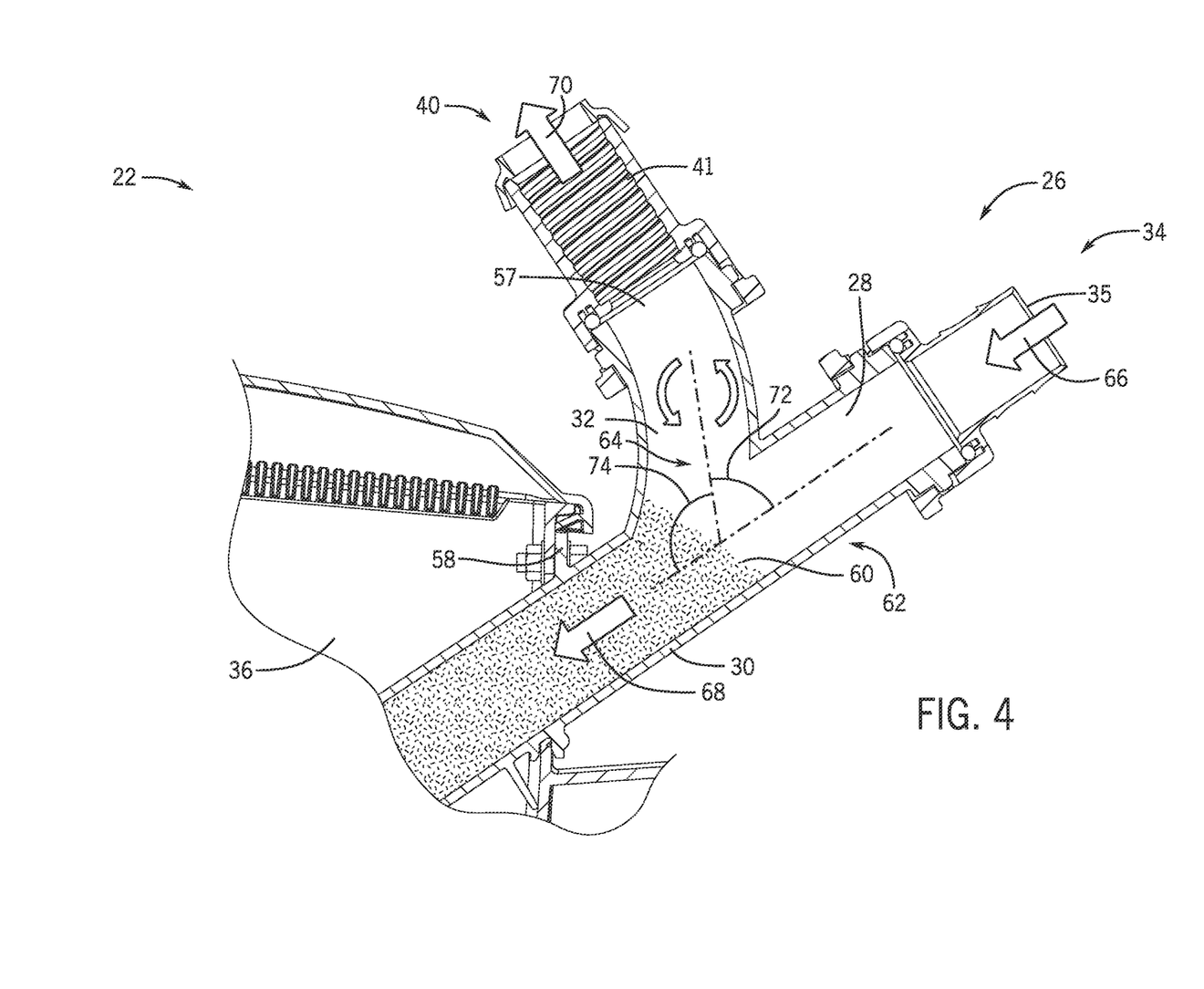
FIG. 4 is a cross-sectional view of a portion of an embodiment of a product flow splitter that may be employed within the agricultural product hopper assembly group of FIG. 2.

FIG. 4 is a cross-sectional view of a portion of an embodiment of the product flow splitter 26 that may be employed within the agricultural product hopper assembly group of FIG. 2. In the illustrated embodiment, the air/agricultural product mixture flows through the distribution line 34 through the distribution line connector 35 into the inlet segment 28, and then the air/agricultural product mixture flows from the inlet segment 28 to the primary outlet segment 30 and enters the primary hopper 36. When the primary hopper 36 is filled with the threshold amount, the agricultural product may begin to build up within the primary outlet segment 30. When the agricultural product reaches a level 60 at an intersection 62 of the primary outlet segment 30, the secondary outlet segment 32, and the inlet segment 28, the air/agricultural product mixture may then be exhausted through the secondary outlet segment 32 to the secondary hopper assembly 24 via the jumper hose 40. The secondary outlet segment 32 has an opening 64 at the intersection 62 to connect to the inlet segment 28 and the primary outlet segment 30. As the level 60 increases, an air pressure differential between the intersection 62 and the secondary outlet 57 may cause the air/agricultural product mixture to flow from the intersection 62 through the opening 64 to the secondary outlet 57. The air pressure at the intersection 62 may drive the agricultural product at the intersection 62 to flow through the opening 64 to the secondary outlet segment 32. The air/agricultural product mixture may then be exhausted through the secondary outlet segment 32 and output from the secondary outlet 57. The air/agricultural product mixture may then flow through the jumper hose connector 41 into the jumper hose 40 and through the jumper hose 40 into the secondary hopper assembly. The secondary hopper assembly 24 is configured to output the agricultural product into the respective agricultural product meter, which is configured to control a flow of the agricultural product into the agricultural product conveying system of the secondary row unit.

In the illustrated embodiment, the opening 64 has a greater area than the secondary outlet 57 of the secondary outlet segment 32, which may cause an air pressure differential between the opening 64 and the secondary outlet 57. The air pressure differential between the opening 64 and the secondary outlet 57 may increase the speed of the air/agricultural product mixture to flow through the jumper hose 40 and into the secondary hopper assembly 24. In the illustrated embodiment, the flow 66 of the air/agricultural product mixture splits in the product flow splitter 26 into two flows of the air/agricultural product mixture, e.g., a primary flow 68 and a secondary flow 70. The primary flow 68 of the air/agricultural product mixture flows from the inlet segment 28 through the primary outlet segment 30 and then into the primary hopper 36. The secondary flow 70 of the air/agricultural product mixture flows from the inlet segment 28 through the secondary outlet segment 32, into the jumper hose 40, and then into the secondary hopper assembly.

As described above, during operation of the primary row unit 12, the flow 66 of the air/agricultural product mixture from the distribution line 34 through the distribution line connector 35 enters the inlet segment 28, and the flow 66 continues as the primary flow 68 of the air/agricultural product mixture through the primary outlet segment 30 and into the primary hopper 36. Because the primary hopper 36 is vented, the airflow carrying the agricultural product is exhausted to the environment, thereby enabling the agricultural product to collect within the storage area of the primary hopper 36. As the storage area 48 fills with agricultural product, the agricultural product may collect within at least a portion of the primary outlet segment 30. The agricultural product within the primary outlet segment 30 of the product flow splitter 26 may substantially reduce or block the primary flow 68 of the air/agricultural product mixture to the primary hopper assembly 22. Accordingly, the primary flow 68 of the air/agricultural product to the primary hopper assembly 22 automatically terminates in response to the primary hopper assembly 22 receiving the maximum target amount of the agricultural product.

The agricultural product may continue to build up within the primary outlet segment 30 because the air exhausts through the secondary outlet segment 32. Accordingly, the level of the agricultural product within the primary outlet segment 30 may increase and approach the intersection 62 as the flow 66 of the air/agricultural product mixture continues flowing from the distribution line 34 through the distribution line connector 35 to the product flow splitter 26. As the agricultural product buildup increases to the level 60 at the intersection 62, the air/agricultural product mixture flows from the intersection 62 through the opening 64 to the secondary outlet segment 32 as the secondary flow 70. The secondary flow 70 of the air/agricultural product mixture moves the agricultural product through the secondary outlet segment 32 into the secondary hopper assembly via the jumper hose 40. As the level of the agricultural product within the primary outlet segment 30 decreases during operation of the row unit (e.g., as the corresponding agricultural product meter conveys the agricultural product to the corresponding agricultural product conveying system of the primary row unit), the airflow path to the primary hopper vent is reestablished, thereby enabling the primary flow 68 of the air/agricultural product mixture to the primary hopper assembly 22 to resume. Accordingly, the primary flow 68 of the air/agricultural product to the primary hopper assembly 22 is automatically resumed in response to the agricultural product level in the primary hopper assembly 22 decreasing below the minimum target amount.

In the illustrated embodiment, the secondary outlet segment 32 is curved/arcuate and extends away from the inlet segment 28. As illustrated, the secondary outlet segment 32 curves away from the inlet segment 28 along the flow direction of the air/agricultural product mixture through the secondary outlet segment 32. At the intersection 62, an angle 72 between the secondary outlet segment 32 and the inlet segment 28 is an acute angle between about 0 degrees and 90 degrees. At the intersection 62, an angle 74 between the secondary outlet segment 32 and the primary outlet segment 30 is an obtuse angle between about 90 degrees and 180 degrees. In certain embodiments, the inlet segment and/or the primary outlet segment may not be straight, and the angle may not be obtuse. The secondary outlet segment 32 has a smooth inner surface. As the level of the agricultural product at the intersection increases, the air pressure differential between the intersection 62 and the secondary outlet 57 may cause the air/agricultural product mixture to flow through the opening 64 into the secondary outlet segment 32. The curved secondary outlet segment 32 and the smooth inner surface of the secondary outlet segment 32 facilitates flow of the air/agricultural product mixture through the secondary outlet segment 32, thereby substantially reducing or eliminating the possibility of plugging in the secondary outlet segment 32. The agricultural product in the curved secondary outlet segment 32 may slide back to the inlet segment 28 and join the primary flow 68 to flow into the primary outlet segment 30, or, be picked up by the secondary flow 70 and flows into the secondary outlet segment. The curved shape leaves no place in the secondary outlet segment 32 to trap the agricultural product, thereby substantially reducing or eliminating the possibility of plugging at the intersection 62. In certain embodiments, the secondary outlet segment is configured to intersect the inlet segment substantially tangential to a direction of the inlet segment and/or the primary outlet segment.

Figure 5:
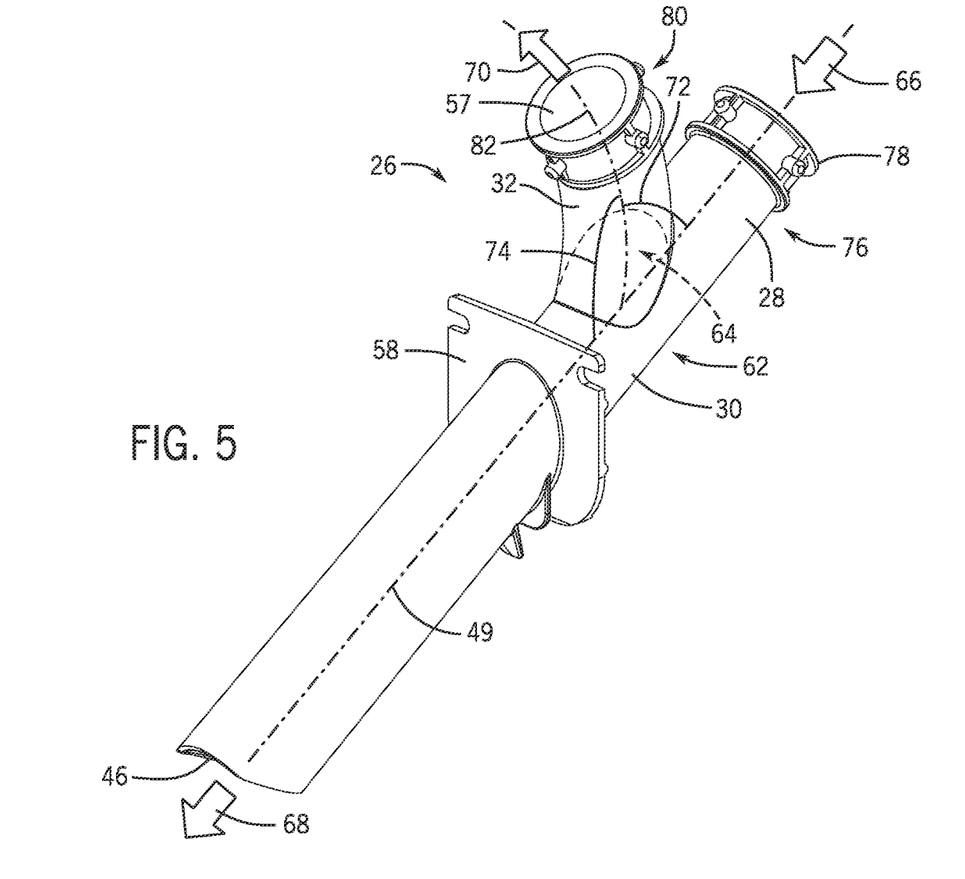
FIG. 5 is a perspective view of the product flow splitter of FIG. 4.

FIG. 5 is a perspective view of the product flow splitter 26 of FIG. 4. In the illustrated embodiment, the flange 58 is coupled to the primary outlet segment 30 for mounting the primary outlet segment 30 to the primary hopper. In certain embodiments, the primary outlet segment 30 is configured to be coupled to the primary hopper by using the flange 58 located near the secondary outlet segment 32. In certain embodiments, an additional drop tube may be coupled to the primary outlet 46 to output the primary flow 68 of the air/agricultural product mixture into the primary hopper.

In the illustrated embodiment, the air/agricultural product mixture flows through the distribution line 34 through the distribution line connector 35 into the inlet segment 28 as the flow 66. At the intersection 62, the flow 66 splits into the primary flow 68 and the secondary flow 70. The primary flow 68 passes through the primary outlet segment 30 and enters the primary hopper. The secondary flow 70 passes through the secondary outlet segment 32 and outputs from the secondary outlet 57. The secondary flow 70 then enters the jumper hose, which connects the product flow splitter 26 with the secondary hopper assembly.

In the illustrated embodiment, the inlet segment 28 is substantially linear and the primary outlet segment 30 is substantially linear, and the inlet segment 28 is aligned with the primary outlet segment along the common axis central 49. Accordingly, the flow 66 and the primary flow 68 flow along the common central axis 49. In the illustrated embodiment, the inlet segment 28 and the primary outlet segment 30 are formed as a single straight flow passage 76 (e.g., first flow passage). In certain embodiments, the inlet segment 28 may taper outwardly toward the primary outlet segment 30, and the primary outlet segment 30 may taper outwardly to the primary outlet 46. In the illustrated embodiment, the flow passage 76 tapers out gradually from an inlet 78 of the inlet segment 28 to the primary outlet 46 (e.g., the flow passage 76 may have a 0.5 degree outward taper from the inlet 78 to the primary outlet 46). Furthermore, in the illustrated embodiment, the straight flow passage 76 has a smooth inner surface (e.g., inside the inlet segment 28 and the primary outlet segment 30). In certain embodiments, the passage may have another shape and/or at least a portion of the inside may not be smooth and/or at least a portion of the passage may have a different taper.

In the illustrated embodiment, the secondary outlet segment 32 is curved/arcuate, thereby providing a curved flow passage 80 (e.g., second flow passage) for the air/agricultural product mixture flowing inside the secondary outlet segment 32. The curved flow passage 80 starts from the opening 64 and extends along the secondary outlet segment 32 to the secondary outlet 57. The curved flow passage 80 curves away from the inlet segment 28 along the flow direction of the air/agricultural product mixture through the secondary outlet segment 32. The curved flow passage 80 intersects the flow path through the inlet segment 28 and the primary outlet segment 30 at the intersection 62. At the intersection 62, a curved centerline 82 extending along the curved flow passage 80 and the axis 49 intersect to form the angle 72, which is an acute angle. In addition, at the intersection 62, the curve centerline 82 and the axis 49 intersect to form the angle 74, which is an obtuse angle. Furthermore, the curved flow passage 80 has a smooth inner surface (e.g., inside the secondary outlet segment 32).

In the illustrated embodiment, the straight flow passage 76 has a circular cross-sectional shape. However, in certain embodiments, the straight flow passage may have any other suitable cross-sectional shape or combination of shapes (e.g., including circular, polygonal, polygonal with rounded corners, elliptical, irregular, etc.). In addition, in the illustrated embodiment, the curved flow passage 80 has a circular shape. However, in certain embodiments, the curved flow passage may have any other suitable cross-sectional shape or combination of shapes (e.g., including circular, polygonal, polygonal with rounded corners, elliptical, irregular, etc.). In addition, the cross-sectional shape may vary within the straight flow passage. For example, in certain embodiments, the cross-sectional shape of the inlet segment may be different than the cross-sectional shape of the primary outlet segment. In certain embodiments, the cross-sectional shape may be different for the straight flow passage and the curved flow passage. In certain embodiments, the cross-sectional shape may vary among the inlet segment, the primary outlet segment, and the secondary outlet segment.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A product flow splitter for an agricultural implement, comprising:
   an inlet segment configured to receive agricultural product from a distribution line;
   a primary outlet segment connected to the inlet segment, wherein a common axis extends through a first center of a cross-section of the inlet segment and a second center of a cross-section of the primary outlet segment, a flow path of the agricultural product extends along the common axis through the inlet segment and the primary outlet segment, the primary outlet segment is configured to output the agricultural product, via a primary outlet, to a storage area within a primary hopper of the agricultural implement, the primary outlet is configured to be positioned offset from an outlet of the primary hopper; and
   a secondary outlet segment connected to the inlet segment, wherein the secondary outlet segment is configured to output the agricultural product to a secondary hopper of the agricultural implement, and the secondary outlet segment is curved.

2. The product flow splitter of claim 1, wherein the inlet segment is substantially linear and the primary outlet segment is substantially linear.

3. The product flow splitter of claim 1, wherein the inlet segment tapers outwardly from the distribution line toward the primary outlet segment.

4. The product flow splitter of claim 1, wherein the primary outlet of the primary outlet segment is configured to be substantially parallel to the outlet of the primary hopper.

5. The product flow splitter of claim 1, wherein the secondary outlet segment curves away from the inlet segment along a flow direction of the agricultural product through the secondary outlet segment.

6. The product flow splitter of claim 1, wherein the secondary outlet segment has a first opening at a connection to the inlet segment and a second opening at an outlet of the secondary outlet segment, and the first opening has a greater cross-sectional area than the second opening.

7. The product flow splitter of claim 6, wherein the secondary outlet segment forms an acute angle with the inlet segment at the connection.

8. An agricultural product hopper group for an agricultural implement, comprising:
   a primary hopper having a storage area;
   a secondary hopper; and
   an agricultural product flow splitter coupled to the primary hopper, wherein the agricultural product flow splitter comprises:
   an inlet segment configured to receive agricultural product from a distribution line;
   a primary outlet segment connected to the inlet segment, wherein a common axis extends through a first center of a cross-section of the inlet segment and a second center of a cross-section of the primary outlet segment, a flow path of the agricultural product extends along the common axis through the inlet segment and the primary outlet segment, the primary outlet segment is configured to output the agricultural product, via a primary outlet, to the storage area within the primary hopper of the agricultural implement, the primary outlet is positioned offset from an outlet of the primary hopper; and
   a secondary outlet segment connected to the inlet segment, wherein the secondary outlet segment is configured to output the agricultural product to the secondary hopper of the agricultural implement, and the secondary outlet segment is curved.

9. The agricultural product hopper group of claim 8, wherein the inlet segment is substantially linear and the primary outlet segment is substantially linear.

10. The agricultural product hopper group of claim 8, wherein the inlet segment tapers outwardly from the distribution line toward the primary outlet segment.

11. The agricultural product hopper group of claim 8, wherein the primary outlet of the primary outlet segment is configured to be substantially parallel to the outlet of the primary hopper.

12. The agricultural product hopper group of claim 8, wherein the secondary outlet segment curves away from the inlet segment along a flow direction of the agricultural product through the secondary outlet segment.

13. The agricultural product hopper group of claim 8, wherein the secondary outlet segment has a first opening at a connection to the inlet segment and a second opening at an outlet of the secondary outlet segment, and the first opening has a greater cross-sectional area than the second opening.

14. The agricultural product hopper group of claim 13, wherein the secondary outlet segment forms an acute angle with the inlet segment at the connection.

15. A product flow splitter for an agricultural implement, comprising:
   a first flow passage having an inlet and a primary outlet, wherein the first flow passage is configured to receive agricultural product via the inlet and to output the agricultural product to a primary hopper of the agricultural implement via the primary outlet, the first flow passage is substantially straight, a common axis extends through a first center of the inlet and a second center of the primary outlet, and a flow path of the agricultural product extends along the common axis from the inlet to the primary outlet; and
   a second flow passage having an opening and a secondary outlet, wherein the second flow passage intersects the first flow passage at the opening and is configured to receive the agricultural product via the opening from the first flow passage, the second flow passage is configured to output the agricultural product to a secondary hopper of the agricultural implement via the secondary outlet, and the second flow passage is curved.

16. The product flow splitter of claim 15, wherein the first flow passage tapers outwardly from the inlet to the primary outlet.

17. The product flow splitter of claim 15, wherein the first flow passage is substantially linear.

18. The product flow splitter of claim 15, comprising a flange configured to couple the first flow passage to the primary hopper.

19. The product flow splitter of claim 15, wherein the second flow passage curves away from the first flow passage along a flow direction of the agricultural product through the secondary outlet.

20. The product flow splitter of claim 15, wherein the opening has a greater cross-sectional area than the secondary outlet.

* * * * *